United States Patent [19]

Eckel

[11] Patent Number: 5,516,123
[45] Date of Patent: May 14, 1996

[54] U-SHAPED SEALING MEMBER FOR SEALING A VALVE COVER HAVING AN IMPACT ABSORBER

[75] Inventor: Hans-Gerd Eckel, Laudenbach, Germany

[73] Assignee: Carl Freudenberg, Weinheim, Germany

[21] Appl. No.: 451,404

[22] Filed: May 26, 1995

[30]    Foreign Application Priority Data

Jun. 8, 1994 [DE] Germany ................... 44 19 967.8

[51] Int. Cl.⁶ ...................................................... F16J 15/04
[52] U.S. Cl. ...................... 277/206 R; 277/212 C; 277/212 FB; 277/189; 277/DIG. 9
[58] Field of Search ..................... 277/205, 206 R, 277/211, 178, 167.5, 212 FB, 212 C, 207 R, 189, DIG. 9; 123/90.38, 90.37, 193.3, 195 C

[56]             References Cited

U.S. PATENT DOCUMENTS 4,499,869  2/1985  Visek ..................... 123/195 C
4,506,768  3/1985  Innocent ............... 277/212 FB
4,718,680  1/1988  Halconruy et al. ....... 277/212 FB
4,754,854  7/1988  Adachi et al. .......... 277/212 FB
5,203,576  4/1993  Miyaoh et al. ............ 277/235 B

FOREIGN PATENT DOCUMENTS 2431651  2/1980  France .

Primary Examiner—William A. Cuchlinski, Jr.
Assistant Examiner—John L. Beres
Attorney, Agent, or Firm—Furgang & Milde

[57]              ABSTRACT

A seal is in the form of a continuous annular strip (3) of elastic material. The seal is intended for insertion between a housing (1) and a lid or cover (2). The surfaces of the sealing strip facing the housing and lid are provided with thicker areas in the form of beads (4). The beads are separated and rest independently liquid-tight against both the housing and the lid. One bead rests off the lid and against the housing and the other rests off the housing and against the lid.

14 Claims, 2 Drawing Sheets

U-SHAPED SEALING MEMBER FOR SEALING A VALVE COVER HAVING AN IMPACT ABSORBER

BACKGROUND OF THE INVENTION

The present invention relates to a seal formed as a continuous annular strip of elastic material. The seal is intended for insertion between a housing and a housing lid or cover.

A flat seal of this general type is known. It is compressed between the housing and lid when they are secured together, e.g., by screws. Any noise that is generated within the housing is transmitted to the lid by the screws and the tightly compressed seal and radiates outwardly from the lid. The known seal is accordingly unsatisfactory from the aspect of noise suppression.

SUMMARY OF THE INVENTION

The principal object of the present invention is accordingly to provide a seal of the aforesaid type that will not transmit noise from a housing to its lid or cover while the system is in use.

This object, as well as other objects which will become apparent from the discussion that follows, are achieved, in accordance with the present invention, by providing a seal of the aforesaid type wherein the surfaces of the annular sealing strip facing the housing and lid are provided with thicker areas in the form of beads that are separated and rest independently in a liquid-tight manner against both the housing and the lid. One bead rests off the lid and against the housing and the other off the housing and against the lid. The zone of the sealing strip between the beads is not elastically tensioned and can accordingly easily attenuate noises. Any noise that occurs in the housing will accordingly be insulated and cannot be transmitted to the lid.

In order to ensure a tight seal that is easy to establish, it is practical to snap the beads into grooves in the housing and the lid, respectively. It is also practical, in order to ensure a tight fit even further, for the beads to be secured to the housing or lid, or both, by clips or clamping strips. In this event, the zone of the sealing strip between the beads can constitute a thin diaphragm which isolates noise.

The cross-section of the sealing strip, in one advantageous embodiment of the invention, is U-shaped. In this event, the strip can be provided with at least one impact absorber that extends into the U. Advantageously, the impact absorber can be arranged essentially parallel to the sides or "legs" of the U. The U should open inward or outward essentially perpendicularly to the opening demarcated by the sealing strip.

When such a seal is installed horizontally, to seal the cylinder cover in an internal combustion engine for example, perpendicular indentations in the cover can easily be resiliently accommodated.

An even greater improvement in the seal can be attained by cementing at least one bead to the housing or lid. Such a bond can be achieved either by secondary adhesives or by directly vulcanizing a sealing strip which is made of rubber.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
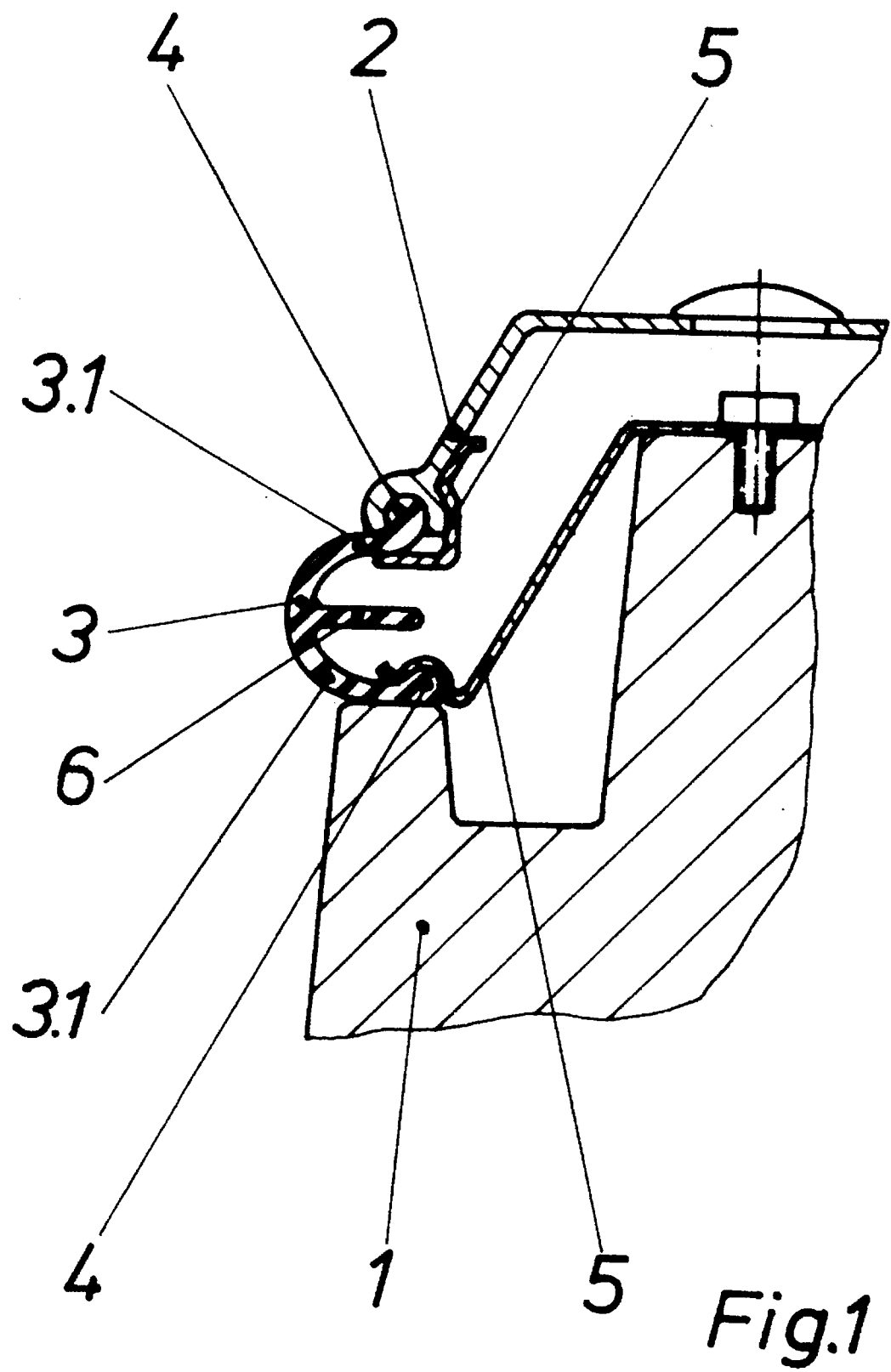
FIG. 1 illustrates one embodiment of a seal in accordance with the present invention intended for the cylinder head of an internal combustion engine.

The preferred embodiments of the present invention will now be described with reference to FIGS. 1 and 2 of the drawings. Identical elements in the two figures are designated with the same reference numerals.

The seal illustrated in FIG. 1 is intended for insertion between a housing 1 of an internal combustion engine (i.e., the engine block) and a housing lid or cover 2, especially a valve cover. The seal consists of a continuous annular rubber strip 3. The cross-section of strip 3 is a U that opens inward at an angle to the opening of housing 1. The sides or legs 3.1 of the U are edged with thicker sections in the form of beads 4. The beads are separated and rest independently against both the housing 1 and cover 2 retained by metal clips or clamps 5. The upper clip 5 forces the bead 4 tightly into a groove in the cover 2. The resulting seal is both effective and easy to establish. One or both of the clips can be secured to the housing 1 or cover 2, respectively, by a bolt. The clips 5 are not connected with each other and are relatively movable.

The zone of the sealing strip between the beads is in the form of a thin and flexible diaphragm.

Approximately in the middle of the U-shaped profile of the sealing strip 3 is a strip-like impact absorber 6 which extends essentially parallel to the sides 3.1 of the U. The impact absorber is intended to prevent contact of the two clips 5 during wide vibratory excursions of the lid 2. This insures that also during such extreme excursions no noise will be transmitted from the housing 1 to the lid 2.

Figure 2:
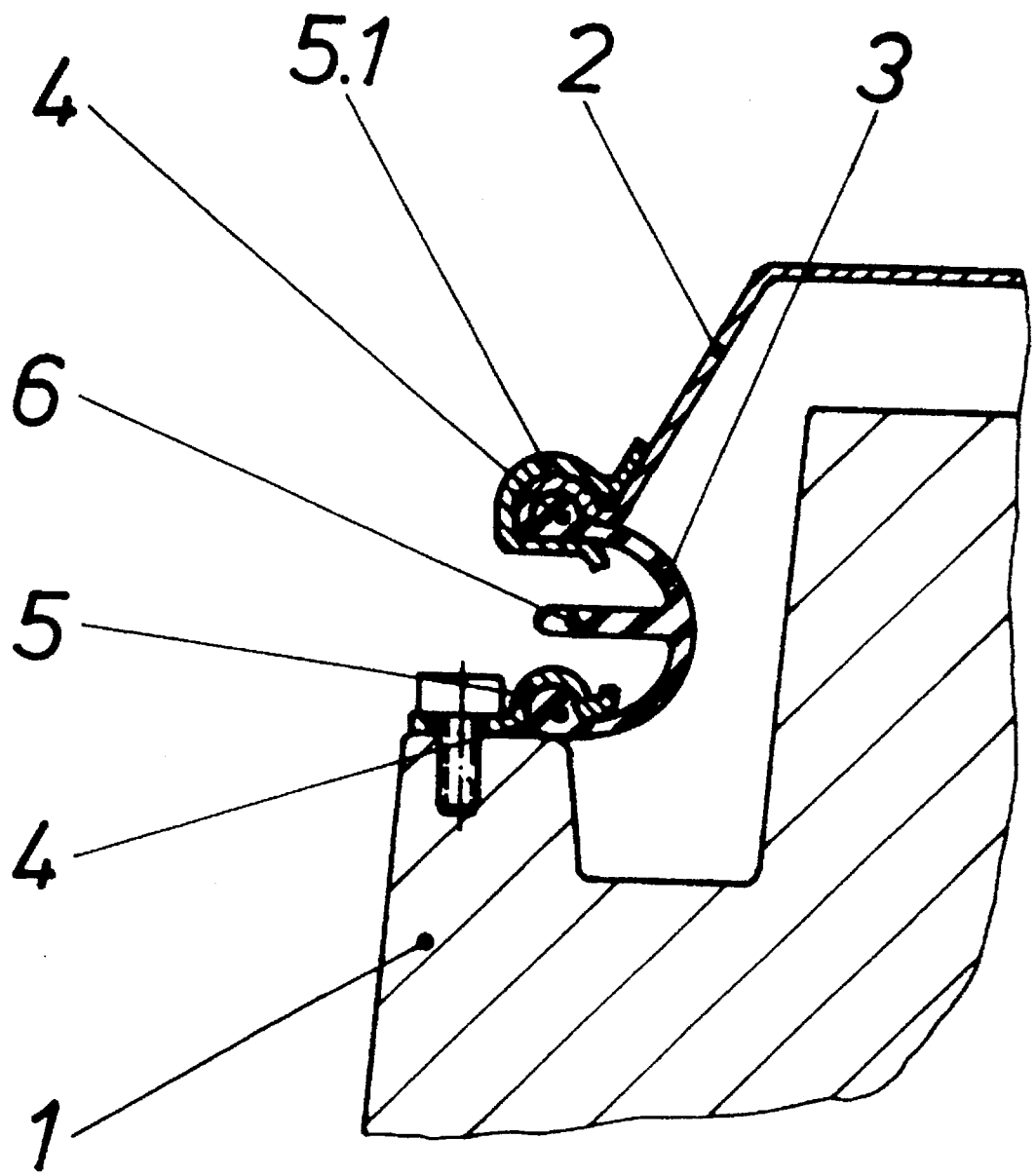
FIG. 2 illustrates another embodiment of a seal intended for a similar application.

The seal illustrated in FIG. 2 differs from that shown in FIG. 1 and described above in that the U-shaped profile of the sealing strip 3 faces outward; i.e., in the opposite direction to that of the embodiment of FIG. 1. The edges of the sealing strip which face the housing 1 and the lid 2 are likewise provided with bead like enlargements. The lower one of these is held fast to the housing 1 by means of a clip or clamp 5; the upper bead is inserted into a groove in the housing lid 2 and anchored in this position by means of a clip 5.1. Consequently, this seal is particularly easy to attach and remove.

There has thus been shown and described a novel seal which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. In a seal in the form of a continuous annular strip of elastic material for insertion between a housing and a lid, the improvement wherein the strip has a U-shaped profile, wherein the sides of the strip facing the housing and lid are provided with thicker areas in the form of beads that are separated and rest independently in a liquid-tight manner against both the housing and the lid, respectively, whereby one bead rests off the lid and against the housing and the other rests off the housing and against the lid, and wherein the strip includes at least one impact absorber within the U-shaped profile projecting inward from the side of the strip between said beads.

2. The seal defined in claim 1, wherein the beads snap into grooves in the housing and lid.

3. The seal defined in claim 1, wherein the beads are secured to at least one of the housing and lid by clips.

4. The seal defined in claim 1, wherein the zone of the strip between the beads is relatively thin and constitutes a diaphragm, thereby to attenuate the transmission of noise vibrations.

5. The seal defined in claim 1, wherein the impact absorber extends substantially parallel to the sides of the U-shaped profile.

6. The seal defined in claim 1, wherein the U-shaped profile opens inwardly, essentially perpendicular to the opening demarcated by the strip.

7. The seal defined in claim 1, wherein a bead is cemented to at least one of the housing and lid.

8. In a seal in the form of a continuous annular strip of elastic material for insertion between a housing and a lid, the improvement wherein the sides of the strip facing the housing and lid are provided with thicker areas in the form of beads that are separated and rest independently in a liquid-tight manner against both the housing and the lid, respectively, whereby one bead rests off the lid and against the housing and the other rests off the housing and against the lid, wherein at least one of the beads is secured to one of the housing and lid, respectively, by a clamp extending around the opposite side of said one bead from said one of the housing and lid, and wherein said improvement further comprises means for securing said clamp to said one of the housing and lid.

9. The seal defined in claim 8, wherein the zone of the strip between the beads is relatively thin and constitutes a diaphragm, thereby to attenuate the transmission of noise vibrations.

10. The seal defined in claim 8, wherein the strip has a U-shaped profile.

11. The seal defined in claim 10, wherein the strip includes at least one impact absorber within the U-shaped profile.

12. The seal defined in claim 11, wherein the impact absorber extends substantially parallel to the sides of the U-shaped profile.

13. The seal defined in claim 10, wherein the U-shaped profile opens inwardly, essentially perpendicular to the opening demarcated by the strip.

14. The seal defined in claim 8, wherein said securing means is at least one bolt.

* * * * *